US008599867B2

(12) United States Patent
Hicks, III et al.

(10) Patent No.: US 8,599,867 B2
(45) Date of Patent: *Dec. 3, 2013

(54) COMMUNICATION ENVIRONMENT SWITCHOVER

(71) Applicant: AT&T Intellectual Property I, L.P., Atlanta, GA (US)

(72) Inventors: John Alson Hicks, III, Roswell, GA (US); James A. Worsham, Jr., Buford, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,102

(22) Filed: Nov. 19, 2012

(65) Prior Publication Data

US 2013/0078997 A1  Mar. 28, 2013

Related U.S. Application Data

(63) Continuation of application No. 12/626,167, filed on Nov. 25, 2009, now Pat. No. 8,351,444, which is a continuation of application No. 11/513,720, filed on Aug. 31, 2006, now Pat. No. 7,646,777, which is a continuation-in-part of application No. 10/614,737, filed on Jul. 7, 2003, now Pat. No. 8,457,082.

(60) Provisional application No. 60/794,925, filed on Apr. 26, 2006, provisional application No. 60/798,824, filed on May 9, 2006.

(51) Int. Cl.
*H04L 12/28* (2006.01)
*H04L 12/56* (2011.01)
*H04W 4/00* (2009.01)
*H04W 36/00* (2009.01)

(52) U.S. Cl.
USPC ........... 370/401; 370/332; 370/338; 455/436; 455/465

(58) Field of Classification Search
USPC .......... 370/316–328, 331–352; 455/405–415, 455/418–422, 436–550; 709/203–223
See application file for complete search history.

(56) References Cited

U.S. PATENT DOCUMENTS 5,127,042 A    6/1992  Gillig et al.
5,159,592 A   10/1992  Perkins
(Continued)

FOREIGN PATENT DOCUMENTS

WO    WO9731434    8/1997

OTHER PUBLICATIONS

U.S. Appl. No. 10/614,751, filed Jul. 7, 2003, entitled "System and Method for Providing a Single Telephone Number for Use with a Plurality of Telephone Handsets", Inventors: Hicks et al.

(Continued)

*Primary Examiner* — M. Phan
(74) *Attorney, Agent, or Firm* — Turocy & Watson, LLP

(57) ABSTRACT

Communication environment switchover may be provided. A received signal strength level may be determined corresponding to a signal sent from a first device and received at a second device. The received signal strength level may be measured at the second device. In addition, the first device may be re-provisioned. For example, the first device may be re-provisioned to communicate in a second environment if the first device is provisioned to communicate in a first environment and if the received signal strength level is greater than a first threshold value. Furthermore, the first device to be re-provisioned to communicate in the first environment if the first device is provisioned to communicate in the second environment and if the received signal strength level is less than a second threshold value. The second threshold value may be less than the first threshold value.

20 Claims, 4 Drawing Sheets

(56) References Cited

U.S. PATENT DOCUMENTS

| | | | |
|---|---|---|---|
| 5,454,032 A | 9/1995 | Pinard | |
| 5,594,782 A | 1/1997 | Zicker et al. | |
| 5,875,404 A | 2/1999 | Messiet | |
| 5,915,220 A | 6/1999 | Chelliah | |
| 5,915,224 A | 6/1999 | Johnson | |
| 5,920,815 A | 7/1999 | Akhavan | |
| 5,963,864 A | 10/1999 | O'Neil et al. | |
| 6,044,267 A | 3/2000 | Foladare et al. | |
| 6,081,726 A | 6/2000 | Back | |
| 6,097,804 A | 8/2000 | Gilbert et al. | |
| 6,141,556 A | 10/2000 | Dougherty et al. | |
| 6,181,938 B1 | 1/2001 | Salmela et al. | |
| 6,236,852 B1 | 5/2001 | Veerasamy et al. | |
| 6,259,782 B1 | 7/2001 | Gallant | |
| 6,363,246 B1 | 3/2002 | Williams et al. | |
| 6,373,817 B1 | 4/2002 | Kung et al. | |
| 6,393,484 B1 | 5/2002 | Massarani | |
| 6,404,764 B1 | 6/2002 | Jones et al. | |
| 6,405,041 B1 | 6/2002 | Mukerjee et al. | |
| 6,434,394 B1 | 8/2002 | Grundvig et al. | |
| 6,449,483 B1 | 9/2002 | Akhteruzzaman | |
| 6,611,692 B2 | 8/2003 | Raffel et al. | |
| 6,681,118 B2 | 1/2004 | Raffel et al. | |
| 6,704,580 B1 | 3/2004 | Fintel | |
| 6,763,226 B1 | 7/2004 | McZeal, Jr. | |
| 6,766,160 B1 | 7/2004 | Lemilainen et al. | |
| 6,792,095 B1 | 9/2004 | Frank | |
| 6,826,174 B1 | 11/2004 | Erekson et al. | |
| 6,829,477 B1 | 12/2004 | Lu et al. | |
| 6,829,481 B2 | 12/2004 | Souissi | |
| 6,853,851 B1 | 2/2005 | Rautiola et al. | |
| 6,865,372 B2 | 3/2005 | Mauney et al. | |
| 6,868,072 B1 | 3/2005 | Lin et al. | |
| 6,876,852 B1 | 4/2005 | Li et al. | |
| 6,879,574 B2 | 4/2005 | Naghian et al. | |
| 6,922,559 B2 | 7/2005 | Mohammed | |
| 6,944,150 B1 | 9/2005 | McConnell et al. | |
| 6,950,674 B2 | 9/2005 | Jarrett | |
| 6,970,474 B1 | 11/2005 | Sinha | |
| 6,978,003 B1 | 12/2005 | Sylvain | |
| 7,039,027 B2* | 5/2006 | Bridgelall | 370/329 |
| 7,075,918 B1 | 7/2006 | Kung et al. | |
| 7,107,620 B2 | 9/2006 | Haverinen et al. | |
| 7,127,239 B2 | 10/2006 | Ogman et al. | |
| 7,200,112 B2 | 4/2007 | Sundar et al. | |
| 7,215,959 B2* | 5/2007 | Creamer et al. | 455/436 |
| 7,257,205 B2 | 8/2007 | Forte | |
| 7,277,724 B2* | 10/2007 | Jones et al. | 455/553.1 |
| 7,359,371 B2 | 4/2008 | Emley et al. | |
| 7,369,856 B2* | 5/2008 | Ovadia | 455/439 |
| 7,406,324 B1* | 7/2008 | McConnell | 455/466 |
| 7,466,991 B2* | 12/2008 | Everson et al. | 455/552.1 |
| 7,502,615 B2* | 3/2009 | Wilhoite et al. | 455/442 |
| 7,610,047 B2 | 10/2009 | Hicks, III et al. | |
| 7,627,338 B2 | 12/2009 | Hicks, III et al. | |
| 7,646,777 B2 | 1/2010 | Hicks, III et al. | |
| 7,657,270 B2 | 2/2010 | Hicks, III et al. | |
| 7,805,141 B1 | 9/2010 | Chow et al. | |
| 2002/0024937 A1 | 2/2002 | Barnard et al. | |
| 2002/0072390 A1 | 6/2002 | Uchiyama | |
| 2002/0116464 A1 | 8/2002 | Mak | |
| 2002/0137500 A1 | 9/2002 | Brooking et al. | |
| 2002/0141390 A1 | 10/2002 | Fangman et al. | |
| 2002/0147008 A1 | 10/2002 | Kallio | |
| 2002/0157007 A1 | 10/2002 | Sashihara | |
| 2003/0039242 A1 | 2/2003 | Moore | |
| 2003/0115261 A1 | 6/2003 | Mohammed | |
| 2003/0119548 A1 | 6/2003 | Mohammed | |
| 2003/0134638 A1 | 7/2003 | Sundar et al. | |
| 2003/0134658 A1 | 7/2003 | Kaminski et al. | |
| 2003/0139180 A1 | 7/2003 | McIntosh et al. | |
| 2003/0157929 A1 | 8/2003 | Janssen et al. | |
| 2003/0186676 A1 | 10/2003 | Ogman et al. | |
| 2004/0017901 A1 | 1/2004 | Lim | |
| 2004/0030791 A1 | 2/2004 | Dorenbosch et al. | |
| 2004/0072593 A1 | 4/2004 | Robbins et al. | |
| 2004/0114603 A1 | 6/2004 | Suhail et al. | |
| 2004/0132500 A1 | 7/2004 | Rogalski et al. | |
| 2004/0141484 A1 | 7/2004 | Rogalski et al. | |
| 2004/0146021 A1* | 7/2004 | Fors et al. | 370/331 |
| 2004/0162092 A1 | 8/2004 | Marsico et al. | |
| 2004/0203788 A1 | 10/2004 | Fors et al. | |
| 2004/0219948 A1 | 11/2004 | Jones et al. | |
| 2004/0229634 A1 | 11/2004 | Bushnell et al. | |
| 2005/0070272 A1 | 3/2005 | Marangos | |
| 2005/0190789 A1 | 9/2005 | Salkini et al. | |
| 2005/0286501 A1 | 12/2005 | Higuchi | |
| 2007/0083470 A1* | 4/2007 | Bonner et al. | 705/51 |
| 2007/0153736 A1* | 7/2007 | Mow et al. | 370/331 |
| 2008/0026775 A1 | 1/2008 | Arazi et al. | |

OTHER PUBLICATIONS

U.S. Appl. No. 10/614,744, filed Jul. 7, 2003, entitled "System and Method for Providing Integrated Voice and Data Services Utilizing Wired Cordless Access with Unlicensed/Unregulated Spectrum and Wired Access with Licensed/Regulated Spectrum", Inventors: Hicks et al.

U.S. Appl. No. 11/041,604, filed Jan. 24, 2005, entitled "System and Method for Providing Integrated Voice and Data Services Utilizing Wired Cordless Access with Unlicensed Spectrum and Wired Access with Licensed Spectrum", Inventors: Hicks et al.

USPTO Official Action issued Apr. 22, 2005 on U.S. Appl. No. 10/614,751, filed Jul. 7, 2003, entitled "System and Method for Providing a Single Telephone Number for Use with a Plurality of Telephone Handsets", Inventors: Hicks et al.

USPTO Official Action issued May 4, 2005 on U.S. Appl. No. 10/614,744, filed Jul. 7, 2003, entitled "System and Method for Providing Integrated Voice and Data Services Utilizing Wired Cordless Access with Unlicensed/Unregulated Spectrum and Wired Access with Licensed/Regulated Spectrum", Inventors: Hicks et al.

U.S. Official Action dated Oct. 17, 2005 cited in U.S. Appl. No. 10/614,751.

U.S. Final Official Action dated Jan. 30, 2006 cited in U.S. Appl. No. 10/614,744.

U.S. Official Action dated Apr. 20, 2006 cited in U.S. Appl. No. 10/614,751.

U.S. Appl. No. 10/614,737, filed Jul. 7, 2003 entitled System and Method for Providing Integrated Voice and Data Services Utilizing Wired Cordless Access with Unlicensed/Unregulated Spectrum.

U.S. Appl. No. 11/234,951, filed Sep. 26, 2005 entitled "System and Method for Providing Integrated Voice and Data Services Utilizing Wired Cordless Access with Unlicensed Spectrum and Wired Access with Licensed Spectrum".

U.S. Official Action dated Oct. 2, 2006 cited in U.S. Appl. No. 10/614,744.

U.S. Final Official Action dated Dec. 27, 2006 cited in U.S. Appl. No. 10/614,751.

U.S. Office Action dated May 2, 2007 cited in U.S. Appl. No. 10/614,751.

U.S. Final Office Action dated May 15, 2007 cited in U.S. Appl. No. 10/614,744.

U.S. Official Action dated Sep. 27, 2007 cited in U.S. Appl. No. 10/614,737.

U.S. Official Action dated Oct. 10, 2007 cited in U.S. Appl. No. 11/234,951.

U.S. Official Action dated Oct. 30, 2007 cited in U.S. Appl. No. 10/614,744.

U.S. Official Action dated Jan. 11, 2008 cited in U.S. Appl. No. 10/041,604.

U.S. Office Action dated Mar. 6, 2008 cited in U.S. Appl. No. 11/234,951.

U.S. Final Office Action dated Mar. 31, 2008 cited in U.S. Appl. No. 10/614,737.

U.S. Final Office Action dated Jun. 16, 2008 cited in U.S. Appl. No. 10/614,744.

U.S. Office Action dated Jul. 11, 2008 cited in U.S. Appl. No. 11/041,604.

(56) References Cited

OTHER PUBLICATIONS

U.S. Final Office Action dated Jul. 21, 2008 cited in U.S. Appl. No. 10/614,751.
Office Action dated Jan. 22, 2009 cited in U.S. Appl. No. 10/614,744.
Office Action dated Jan. 18, 2008 cited in U.S. Appl. No. 10/614,751.
Final Office Action dated Feb. 3, 2009 cited in U.S. Appl. No. 10/614,751.
Office Action dated Sep. 5, 2008 cited in U.S. Appl. No. 10/614,737.
Final Office Action dated Mar. 17, 2009 cited in U.S. Appl. No. 10/614,737, 34 pages.
Office Action dated Dec. 10, 2008 cited in U.S. Appl. No. 11/234,951.
Office Action dated Jan. 29, 2009 cited in U.S. Appl. No. 11/041,604.
Office Action dated Mar. 25, 2009 cited in U.S. Appl. No. 11/513,720.
Final OA mailed Jun. 19, 2009 for U.S. Appl. No. 11/234,951, 21 pages.
OA dated Dec. 10, 2009 for U.S. Appl. No. 10/614,737, 48 pages.
U.S. Appl. No. 11/513,720, filed Aug. 31, 2006 entitled "Communication Environment Switchover".
OA dated Apr. 1, 2010 for U.S. Appl. No. 12/616,736, 48 pages.
OA dated Jun. 25, 2010 for U.S. Appl. No. 12/614,781, 38 pages.
OA dated Jun. 8, 2010 for U.S. Appl. No. 10/614737, 34 pages.
OA dated Dec. 15, 2010 for U.S. Appl. No. 12/626,167, 36 pages.
OA dated Dec. 23, 2010 for U.S. Appl. No. 12/614781, 27 pages.
OA dated Sep. 13, 2010 for U.S. Appl. No. 12/616,736, 27 pages.
OA dated Oct. 26, 2010 for U.S. Appl. No. 10/614,737, 42 pages.
OA dated Dec. 20, 2010 for U.S. Appl. No. 12/730,827, 32 pages.
OA dated Sep. 21, 2011 for U.S. Appl. No. 10/614,737, 43 pages.
OA dated May 21, 2012 for U.S. Appl. No. 12/616,736, 37 pages.
OA dated Apr. 18, 2012 for U.S. Appl. No. 10/614,737, 43 pages.
Notice of Allowance mailed dated Nov. 26, 2012 for U.S. Appl. No. 10/614,737, 36 pages.
OA dated Sep. 25, 2012 for U.S. Appl. No. 12/616,736, 37 pages.
Notice of Allowance mailed dated May 9, 2013 for U.S. Appl. No. 12/614,781, 39 pages.
Office Action dated Jun. 24, 2013 for U.S. Appl. No. 12/616,736. 44 pages.

* cited by examiner

COMMUNICATION ENVIRONMENT SWITCHOVER

This patent application is a continuation of U.S. patent application Ser. No. 12/626,167, filed Nov. 25, 2009 (now U.S. Pat. No. 8,351,444), which is a continuation of U.S. patent application Ser. No. 11/513,720, filed Aug. 31, 2006 (now U.S. Pat. No. 7,646,777), which is a continuation-in-part of U.S. patent application Ser. No. 10/614,737, filed Jul. 7, 2003. Further, this patent application claims priority to U.S. Provisional Patent Application No. 60/794,925, filed Apr. 26, 2006, and U.S. Provisional Patent Application No. 60/798,824, filed May 9, 2006. The entireties of the aforementioned applications are incorporated by reference herein.

BACKGROUND

A dual mode handset (DMH) is the combination of a wireless fidelity session initiation protocol (WiFi SIP) cordless telephone and a cellular telephone. The DMH is capable of operating in an IEEE 802.11 standard environment, such as 802.11b/g, over an unlicensed spectrum inside a home or business and in a cellular environment (such as GSM or CDMA) over licensed spectrum. The DMH can be designed such that it can "roam" between WiFi and cellular environments. Moreover, the DHM can support an active call handover when roaming between environments when there is overlap between the WiFi coverage and the cellular coverage. This often causes problems because the conventional roaming strategy many times causes active calls to be dropped when roaming between environments. For example, when switching to WiFi during roaming, while a WiFi signal may be present, it may be too weak to support quality communications.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
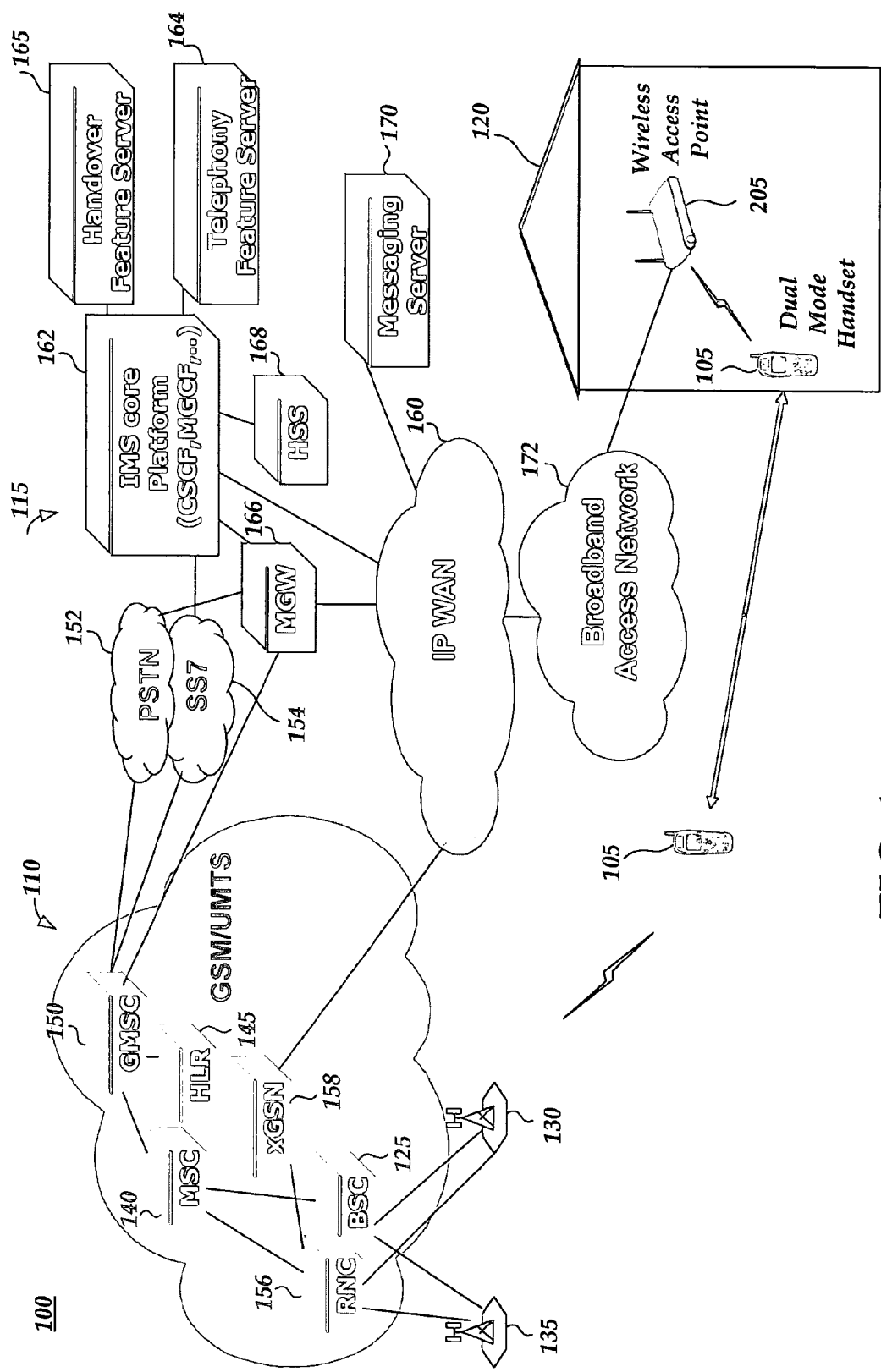
FIG. 1 shows a system for providing communication environment switchover.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the present invention, communication environment switchover may be provided. A received signal strength level may be determined corresponding to a signal sent from a first device and received at a second device. The received signal strength level may be measured at the second device. In addition, the first device may be re-provisioned. For example, the first device may be re-provisioned to communicate in a second environment if the first device is provisioned to communicate in a first environment and if the received signal strength level is greater than a first threshold value. Furthermore, the first device to be re-provisioned to communicate in the first environment if the first device is provisioned to communicate in the second environment and if the received signal strength level is less than a second threshold value. The second threshold value may be less than the first threshold value.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

Communication environment switchover may be provided. FIG. 1 shows a system for providing communication environment switchover 100. Consistent with embodiments of the present invention, a first device 105 is capable of operating in a first environment 110 and within a second environment 115. First environment 110 may comprise a wireless network such as a cellular environment (e.g., GSM, TDMA, CDMA, CDMA 2000, UTMS, and EDGE) over a licensed (i.e., regulated) spectrum. Second environment 115 may comprise a packetized data network comprising, for example, a WiFi/voice-over-internet protocol (VoIP) network. Second environment 115 may utilize the IEEE 802.11 standard (e.g., 802.11b/g) over an unlicensed (i.e., unregulated) spectrum inside or outside a structure 120 (e.g., a home or business). First environment 110 may comprise a licensed (i.e., regulated) environment that may utilize regulated wireless communications frequencies comprising frequencies assigned to a service provider. Second environment 115 may comprise an unlicensed (i.e., unregulated) wireless environment configured to provide wireless service over at least one frequency not assigned to a service provider. The service provider may comprise any enterprise that provides communications services.

First device 105 may comprise a DMH. As stated above, DMH is the combination of a WiFi SIP cordless phone and a cellular phone. It is capable of operating, for example, in an 802.11 environment, such as 802.11b/g, over unlicensed spectrum inside a home or business and in a cellular environment, such as GSM or CDMA, over licensed spectrum. Supported by 3GPP IP Multimedia Subsystem (IMS) infrastructure, a DMH, for example, can roam between the second environment 115 (e.g., WiFiNoIP) and the first environment 110 (e.g., GSM cellular). Furthermore, DMH can support "in-call handover" of an active telephone call when roaming, for example, from a WiFiNoIP environment to a GSM cellular environment or from a GSM cellular environment to a WiFi/VoIP environment. An in-call handover can occur, for example, if there is overlap between the WiFi coverage and the GSM cellular coverage. Consequently, consistent with an embodiment of the invention, a process is provided for effectively and reliably triggering roaming, for example, from the GSM cellular environment to a WiFiNoIP environment and for triggering in-call handovers between WiFiNoIP and GSM environments. While the aforementioned is described in terms of roaming between a WiFiNoIP environment to a GSM cellular environment, these environments are examples and embodiments of the invention may roam between any two or more environments.

As shown in FIG. 1, first environment 110 comprises a GSM/UMTS system. In this example, first environment 110 comprises, for example, a base station controller (BSC) 125 and base transceiver stations (BTSs) 130 and 135. BSC 125 controls BTS 130 and may control a plurality of other base transceiver stations (e.g., BTS 135) in addition to BTS 130. BTS 130 may comprise radio transmission and reception equipment located at an antenna site. Associated with first environment 110, a transcoder/rate adaption unit (TRAU) (not shown) may perform speech encoding and speech decoding and rate adaptation for transmitting data. As a subpart of BTS 130, the TRAU may be located away from BTS 130, for example, at a remote mobile switching center. When the TRAU is located in this way, the low transmission rate of speech code channels allows more compressed transmission between BTS 130 and the TRAU.

Furthermore, first environment 110 includes a mobile switching center (MSC) 140, a home location register (HLR) 145, and a gateway mobile switching center (GMSC) 150. GMSC 150 manages the communication between subscribers using first environment 110 and other telecommunications users, for example, those using publicly switched telephone network (PSTN) 152. PSTN 152 may comprise, for example, the worldwide voice telephone network.

MSC 140 coordinates call set-up to and from subscribers such as a user using DMH 105. MSC 140 may control several base station controllers such as, and similar to BSC 125. GMSC 150 is used to interface with external networks for communication with users outside of the wireless system, such users on PSTN 152.

HLR 145 may comprise a stand-alone computer without switching capabilities, a database that contains subscriber information, and information related to the subscriber's current location, but not the actual location of the subscriber. An authentication center (AUC) portion (not shown) of HLR 145 manages the security data for subscriber authentication. Another sub-division of HLR 145 may include an equipment identity register (EIR) (not shown) that may store data relating to mobile equipment.

First environment 110 may also include a visitor location register (VLR) (not shown). The VLR links to one or more mobile switching center located on other systems, temporarily storing subscription data of subscribers currently served by MSC 140. The VLR holds more detailed data than HLR 145.

GMSC 150 is utilized to interface with PSTN 152. In order to set up a requested call, the call is initially routed to GMSC 150, that finds the correct home location register by knowing the director number of the subscriber. GMSC 150 has an interface with an external network, such as PSTN 152, for gatewaying communications.

First environment 110 and second environment 115 are connected using a signal system 7 (SS7) network 154 in an ISDN user part (ISUP) protocol. SS7 is a global standard for telecommunications defined by the Telecommunication Standardization Sector of the International Telecommunication Union. The SS7 standard defines the procedures and protocol by which network elements in a public switched telephone network exchange information over a digital signaling network to effect wireless and wireline call setup, routing, and control. ISUP defines the protocol and procedures used to set-up, manage, and release trunk circuits that carry voice and data calls over a public switched telephone network. ISUP is used for both ISDN and non-ISDN calls. Calls that originate and terminate at the same switch do not use ISUP signaling.

First environment 110 may also enable general packet radio service (GPRS). GPRS is an enhancement to the GSM mobile communications system that supports data packets. GPRS enables continuous flows of IP data packets over the system for such applications as Web browsing and file transfer. In order to implement GPRS, first environment 110 may use RNC 156 and GPRS service node (xGSN) 158 to connect DMH to an IP WAN 160 (e.g., the Internet).

Second environment 115 includes 3GPP IP Multimedia System (IMS) infrastructure 162, a telephony feature server 164, a handover feature server 165, a multimedia gateway (MGW) 166, an HSS 168, a messaging server 170, IP WAN 160, and a broadband access network 172. IMS 162 comprises a number of different servers, at least one of which causes active calls to be handed between first environment 110 and second environment 115. To facilitate DMH 1053's roaming between first environment 110 and second environment 115, IMS 162 may set-up a three-party call between DMH 105 on both environments. Once the three-party call is established, IMS 162 may drop the leg of the three-party call corresponding to the environment from which DMH 105 is roaming.

Telephony feature server 164 provides users in second environment 115 various calling feature, such as call waiting, caller ID, and call forwarding to name a few. Messaging server 170 provides users in second environment 115 with voice message features. MGW 166 is used to connect PSTN 152 with IP WAN 160, that may comprise, for example the Internet. Broadband access network 172 may comprise a network operated by a service provider used to provide access to IP WAN 160 from structure 120.

Figure 2:
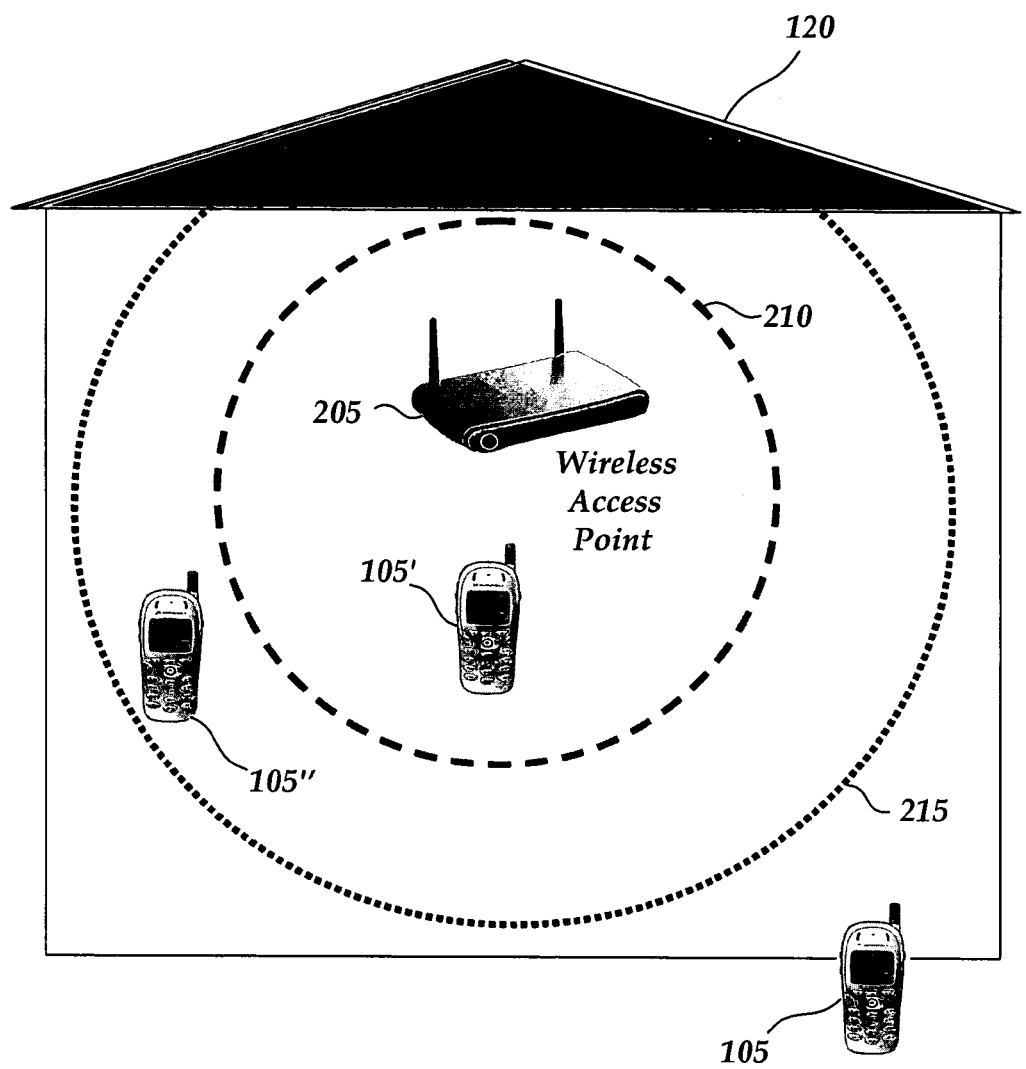
FIG. 2 shows a structure from the system for providing communication environment switchover shown in FIG. 1.

FIG. 2 shows structure 120 in more detail. For example, the user may be using DMH 105. As the user get closer to the wireless access point 205, a received signal strength level from DMH 105', as measured at wireless access point 205, may be greater than or equal to the first threshold value as illustrated by a first circle 210. In this case, as described in more detail below, DMH 105' switches from operating in first environment 110 to operating in second environment 115. Furthermore, if the user gets farther from wireless access point 205, the received signal strength level from DMH 105 as measured at wireless access point 205 may be less than or equal to the second threshold value as illustrated by a second circle 215. In this case, as described in more detail below, DMH 105 switches from operating in first environment 115 to operating in second environment 110. In this way, DMH 105 may roam between environments as described above. When DMH 105" is between first circle 210 and second circle 215, DMH 105" remains operating in the environment it is currently provisioned to operate. For example, if DMH 105" passed from outside second circle 215 to the area between first circle 210 and second circle 215, DHM 105" remains provisioned to operate in first environment 110. If, however, DMH 105" passed from inside first circle 210 to the area between first circle 210 and second circle 215, DHM 105" remains provisioned to operate in second environment 115. While FIG. 2 shows first circle 210 and second circle 215 as being symmetrical, the boundaries of the first threshold value and the first threshold value may be asymmetrical.

An embodiment consistent with the invention may be implemented within a system for providing communication environment switchover. The system, for example, may include the first device and/or the second device. Either of the first device and/or the second device may include a processor in which the invention may be embodied. The processor may comprise a memory storage and a processing unit coupled to the memory storage. The processing unit may be operative to determine a received signal strength level corresponding to a signal sent from the first device and received at the second device. The received signal strength level may be measured at the second device. In addition, the processing unit may be operative to cause the first device to be re-provisioned. For example, the processing unit may be operative to cause the first device to be re-provisioned to communicate in a second environment if the first device is provisioned to communicate in a first environment and if the received signal strength level is greater than a first threshold value. Furthermore, the processing unit may be operative to cause the first device to be re-provisioned to communicate in the first environment if the first device is provisioned to communicate in the second environment and if the received signal strength level is less than a second threshold value. The second threshold value may be less than the first threshold value.

Consistent with an embodiment of the present invention, the aforementioned memory, processing unit, and other components may be implemented within a system for providing communication environment switchover, such as system 100 as described above with respect to FIG. 1. Any suitable combination of hardware, software, and/or firmware may be used to implement the memory, processing unit, or other components. By way of example, the memory, processing unit, or other components may be implemented with any of the first device or the second device, in combination with system 100. The aforementioned system and processors are exemplary and other systems and processors may comprise the aforementioned memory, processing unit, or other components, consistent with embodiments of the present invention.

Figure 3:
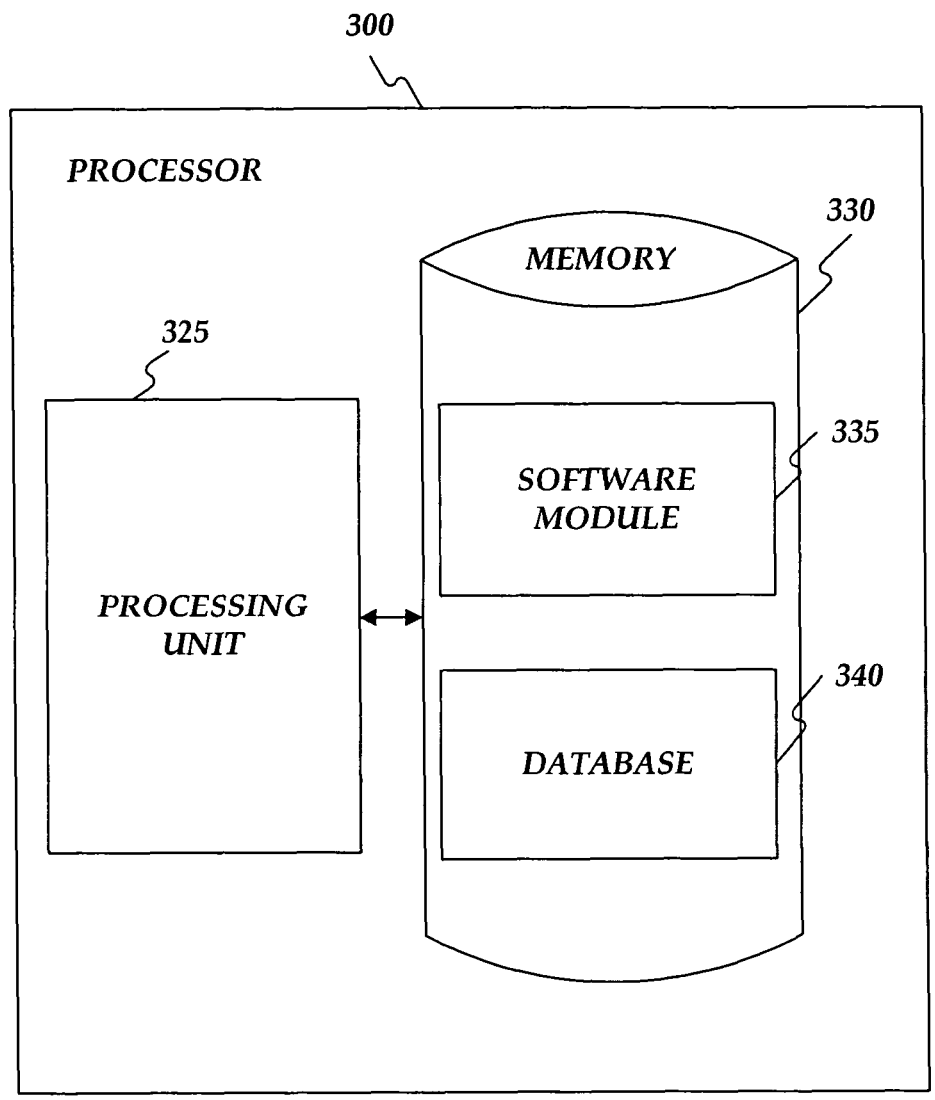
FIG. 3 shows a processor.

FIG. 3 shows a processor 300 that may be used in the first device (e.g., DMH 105) or the second device (e.g., wireless access point 205) as shown in FIG. 1. As shown in FIG. 3, processor 300 may include a processing unit 325 and a memory 330. Memory 330 may include a software module 335 and a database 340. While executing on processing unit 325 embodied in either of the first device or the second device, software module 335 may perform processes for providing communication environment switchover, including, for example, one or more of the stages of a method 400 described below with respect to FIG. 4. Database 340 may be used, for example, to temporarily store information while processor 300 executes one or more stages of method 400.

Processor 300 ("the processor") may be implemented using a personal computer, network computer, mainframe, or other similar microcomputer-based workstation. The processor may though comprise any type of computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a WiFi access point, or a facsimile machine. The aforementioned systems and devices are exemplary and the processor may comprise other systems or devices.

Figure 4:
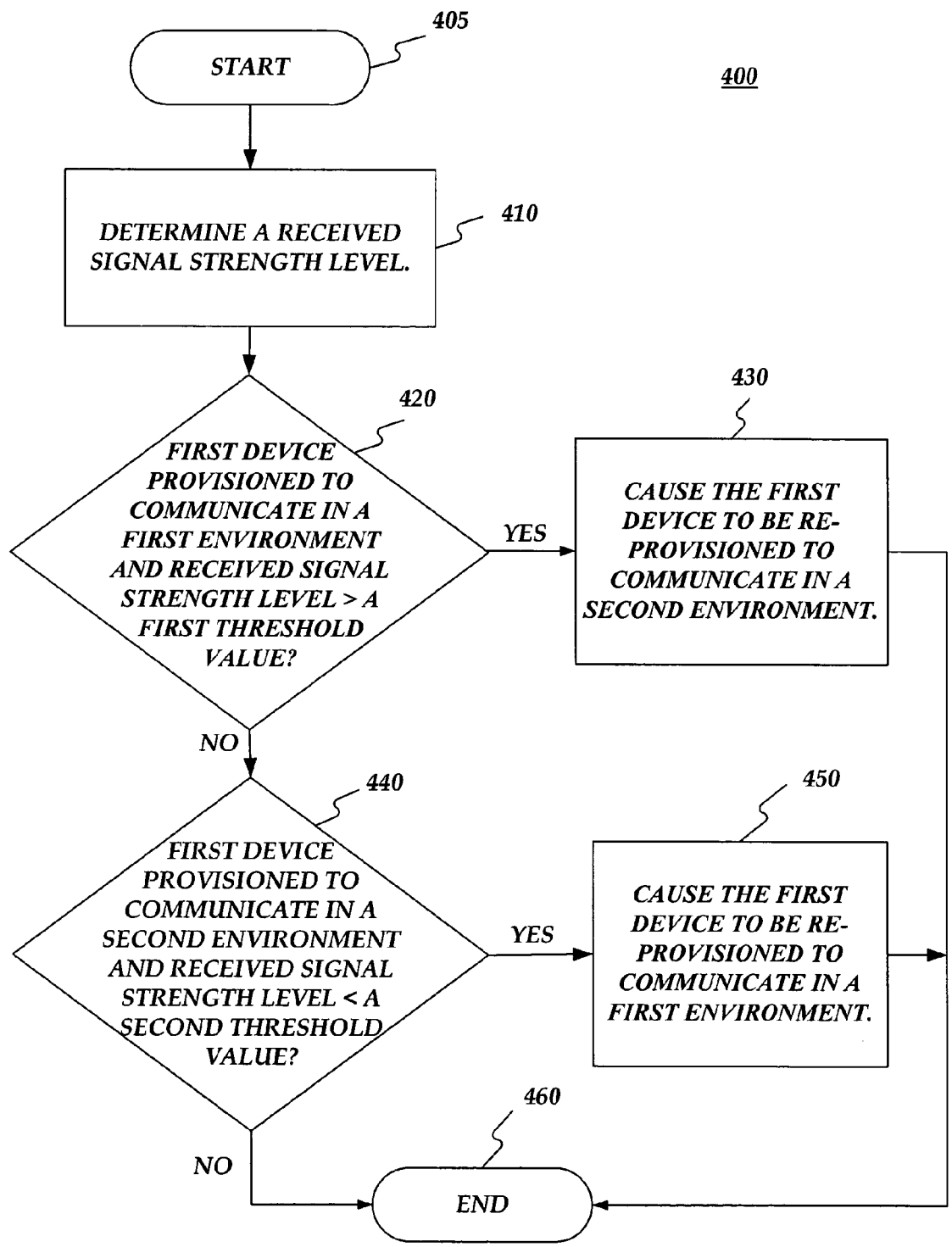
FIG. 4 shows a flow chart of an exemplary method for providing communication environment switchover.

FIG. 4 is a flow chart setting forth the general stages involved in a method 400 consistent with an embodiment of the invention for providing communication environment switchover. Method 400 may be implemented using processor 300 as described above with respect to FIG. 3. Ways to implement the stages of method 400 will be described in greater detail below. Method 400 begins at starting block 405 and proceeds to stage 410 where processor 300 determines a received signal strength level corresponding to a signal sent from a first device (e.g., DMH 105) and received at a second device (e.g., wireless access point 205). The received signal strength level may be measured at the second device.

For example, wireless access point 205 is equipped with a radio transmitter and a receiver. DMH 105 is also equipped with a WiFi radio transmitter and a receiver plus a GSM cellular radio transmitter and receiver. In general, wireless access point 205 has more transmit power and better receive sensitivity than DMH 105's radio transmitter and receiver. Therefore, the ability of DMH 105 to operate effectively in conjunction with wireless access point 205 in supporting a VoIP application over WiFi is primarily determined by the strength of the signal that wireless access point 205 is receiving from DMH 105. Although the mechanism for triggering roaming and in-call handover in DMH 105 between WiFi-NoIP and GSM could be based on the received signal strength that DMH 105 is receiving from wireless access point 205, VoIP over WiFi is a symmetrical application and the communication link from wireless access point 205 to DMH 105 is much stronger than the communication link from DMH 105 to wireless access point 205, i.e., In other words, the communication link between wireless access point 205 and DMH 105 is asymmetric and the communication link from DMH 105 to wireless access point 205 is the weak link.

From stage 410, where processor 300 determines the received signal strength level, method 400 advances to decision block 420 where processor 300 determines if the first device is provisioned to communicate in first environment 110 and if the received signal strength level is greater than a first threshold value. For example, the first threshold value may comprise a value greater than or equal to −50 dBm.

If at decision block 420 processor 300 determined that the first device is provisioned to communicate in first environment 110 and that the received signal strength level is greater than the first threshold value, method 400 advances to stage 430 where processor 300 causes the first device to be re-provisioned to communicate in second environment 115. For example, when the user is outside of structure 120 with DMH 105 operating in the GSM mode with an active call in progress and starts to enter structure 120 and WiFi radio coverage, DMH 105 will automatically associate with wireless access point 205 and software in DMH 105 (e.g., software module 335) and IMS 162 (e.g. using handover feature server 165) will handover the call to WiFiNoIP and turn off the GSM radio. The first stage in the handover process is for DMH 105 to associate with wireless access point 205 and complete session internet protocol (SIP) registration with the IMS Core Platform 162.

After the association and SIP registration processes have been completed, it is important for DMH 105 not to handover the call from GSM to WiFiNoIP until wireless access point 205 is receiving sufficient signal strength from DMH 105 to establish and maintain a VoIP call over WiFi. A process for triggering in-call handover from GSM to WiFi/VoIP after successfully registering with wireless access point 205 is based on DMH 105 frequently querying (e.g., one query and response per second) wireless access point 205 via, for example, an 802.11k interface to obtain information from wireless access point 205 concerning the received signal strength that the access point is measuring from DMH 105. When the received signal strength that wireless access point 205 is measuring from DMH 105 begins to exceed an acceptable received signal strength threshold (e.g., the first threshold) necessary to sustain the VoIP call over WiFi, then software in DMH 105 and handover feature server 165 (e.g. through IMS 162) will trigger the in-call handover from the GSM to WiFiNoIP. For example, handover feature server 165 via third party call control may create a three-way-call by adding a WiFiNoIP leg from the DMH 105 for the existing two-way call between the DMH 105 and an analog PSTN phone 180. The three-way call may consist of the GSM leg from the DMH 105, the WiFi/SIP leg from the DMH 105 and the analog leg from the analog PSTN phone 180. Once handover feature server 165 has both legs established from the DMH 105, handover feature server 165 may drop the GSM leg.

If at decision block 420 processor 300 determined, however, that the first device is not provisioned to communicate in first environment 110 and that the received signal strength level is not greater than the first threshold value, method 400 advances to decision block 440 where processor 300 determines if the first device is provisioned to communicate in second environment 115 and if the received signal strength level less than the second threshold value. For example, the second threshold may comprise a value less than or equal to −70 dBm.

If at decision block 440 processor 300 determines that the first device is provisioned to communicate in the second environment and that the received signal strength level less than the second threshold value, method 400 advances to stage 450 where processor 300 causes the first device to be re-provisioned to communicate in the first environment. For example, when the user is inside structure 120 with DMH 105 operating in the WiFiNoIP mode with an active call and starts to leave WiFi radio coverage, in order to maintain the continuity of the call it is important to trigger the handover of the call from WiFiNoIP to GSM before DMH 105 leaves WiFi coverage. A process for triggering in-call handover is based on DMH 105 frequently querying (e.g., one query and response per second) wireless access point 205 via, for example, an 802.11k interface to obtain information from wireless access point 205 concerning the received signal strength that wireless access point 205 is measuring from DMH 105. When the received signal strength that wireless access point 205 is measuring from DMH 105 begins to fall below an acceptable received signal strength threshold (e.g., the second threshold) necessary to sustain the VoIP call over WiFi, then software in DMH 105 (e.g., software module 335) will trigger the in-call handover from WiFi/VoIP to GSM. For example, handover feature server 165 may create a three-way-call between DMH 105 and an analog PSTN phone 180, one leg of the tree-way-call on GSM and the other leg of the three-way-call on WiFiNoIP. Once handover feature server 165 has both legs established, handover feature server 165 may drop the WiFiNoIP leg.

The mechanisms for executing the in-call handover from the WiFiNoIP environment to the GSM cellular environment have been defined in the 3GPP IP Multimedia Subsystem (IMS) Voice Call Continuity (VCC) working item. This working item defines how an active call can be maintained when DMH 105 moves from an IMS WiFi domain to a circuit switched GSM domain. For example, WiFiNoIP to GSM in-call handover can only occur then there is sufficient GSM received signal by DMH 105 to allow GSM registration outside structure 120. Furthermore, DMH 105 may provide to the user a audible and/or visual indication that the received signal strength level is approaching the second threshold value. For example, when the user is inside structure 120 with DMH 105 operating in the WiFiNoIP mode with an active call and starts to leave WiFi radio coverage, in order to maintain the continuity of the call it is important to trigger the handover of the call from WiFiNoIP to GSM before DMH 105 leaves WiFi coverage. Consequently, DMH 105 may provide to the user the audible and/or visual indication that the received signal strength level is approaching the second threshold value. In response to the indication, the user may wish to move to an area where the received signal strength level is stronger in order to stay in the WiFiNoIP mode.

If at decision block 440 processor 300 determined, however, that the first device is not provisioned to communicate in the second environment and that the received signal strength level is not less than the second threshold value, or from stages 430 and 450, method 400 then ends at stage 460.

In another embodiment, first device 105, for example, can roam between second environment 115 and the first environment 110 even when a call is not active on DMH 105. When the user is outside structure 120 with DMH 105 operating in the GSM mode without an active call and starts to enter structure 120 and WiFi radio coverage, DMH 105 will automatically roam onto WiFi. Software in DMH 105 will turn off the GSM radio in DMH 105. A first stage in the roaming process is for DMH 105 to associate with wireless access point 205 and complete session internet protocol (SIP) registration with the IMS Core Platform 162. After the association process and SIP registration have been completed, DMH 105 may not roam onto WiFiNoIP until wireless access point 205 is receiving sufficient signal strength from DMH 105 to establish and maintain a VoIP call over WiFi. The process for triggering in-call handover after successfully registering with wireless access point 205 is based on DMH 105 frequently querying (e.g., one query and response per second) wireless access point 205 via an 802.11k interface to obtain information from wireless access point 205 concerning the received signal strength that wireless access point 205 is measuring from DMH 105. When the received signal strength that wireless access point 205 is measuring from DMH 105 begins to exceed an acceptable received signal strength threshold (i.e., the first threshold) necessary to sustain the VoIP call over WiFi, then software in DMH 105 will trigger the in-call handover from the GSM to WiFi.

When the user is inside structure 120 with DMH 105 operating in the WiFi mode without an active call and starts to leave WiFi radio coverage, DMH 105 will roam onto GSM. Software in DMH 105 will place the WiFi radio in DMH 105 into a sleep mode. The handover of the call may be triggered from the WiFiNoIP environment to the GSM cellular environment before DMH 105 leaves WiFi coverage. A process for triggering in-call handover is based on DMH 105 regularly querying wireless access point 205 via an 802.11k interface to obtain information from wireless access point 205 concerning the received signal strength that wireless access point 205 is measuring from DMH 105. When the received signal strength that wireless access point 205 is measuring from DMH 105 begins to fall below an acceptable received signal strength threshold (i.e., second threshold) necessary to sustain a VoIP call over WiFi, then software in DMH 105 will trigger the roaming from WiFi to GSM. In order for the roaming mechanism to work effectively as the user is walking out of structure 120 from WiFi to GSM, DMH 105 may frequently query wireless access point 205, such as one query and response per second. It is understood that WiFi to GSM roaming can only occur when DMH 105 is receiving adequate GSM received signal strength to allow GSM registration.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A system, comprising:
    a memory to store instructions; and
    a processor, coupled to the memory, that facilitates execution of the instructions to perform operations, comprising:
        in response to querying a wireless access point device for measured signal strength data, determining signal strength information of a transmitted signal associated with a device based on the measured signal strength data;
        in response to determining that the device is not provisioned to communicate in a first communication environment, determining whether the device is provisioned to communicate in a second communication environment;
        in response to determining that the device is provisioned to communicate in the second communication environment, determining whether a level of the signal strength information is less than a second predetermined level of the signal strength information, wherein the second predetermined level is lower than a first predetermined level of the signal strength information that is associated with a first communication in the second communication environment;
        in response to determining that the device is provisioned to communicate in the second communication environment, and in response to determining that the level of the signal strength information is less than the second predetermined level, facilitating re-provisioning the device for establishing a second communication in the first communication environment; and
        in response to determining that the device is provisioned to communicate in the first communication environment, and in response to determining that the level of the signal strength information is greater than the first predetermined level, facilitating re-provisioning the device for establishing the first communication and a third communication in the second communication environment.

2. The system of claim 1, wherein the first communication environment comprises a set of cellular wireless network devices associated with a service provider.

3. The system of claim 1, wherein the second communication environment comprises a set of packetized data network devices not associated with a service provider.

4. The system of claim 1, wherein the operations further comprise:
facilitating re-provisioning of the device via a handover during an active call.

5. The system of claim 1, wherein the second predetermined level comprises a value not greater than −70 decibel-milliwatts.

6. The system of claim 1, wherein the first predetermined level comprises a value not less than −50 decibel-milliwatts.

7. The system of claim 1, wherein the wireless access point device is an Institute of Electrical and Electronics Engineers 802.11x based access point device.

8. A method, comprising:
in response to sending a request to a wireless access point device for data associated with a signal received by the wireless access point device, determining, by a system comprising a processor, a strength of the signal;
in response to determining that the device is not provisioned to communicate in a first environment, determining, by the system, whether the device is provisioned to communicate in a second environment;
in response to determining that the device is provisioned to communicate in the second environment, determining whether the strength of the signal is less than a second predetermined signal strength, wherein the second predetermined signal strength is lower than a first predetermined signal strength associated with facilitating establishing a first communication in the second environment;
in response to determining that the strength of the signal is less than the second predetermined signal strength, facilitating, by the system, re-provisioning of the device for facilitating a second communication in the first environment; and
in response to determining that the device is provisioned to communicate in the first environment, and in response to determining that the strength of the signal is greater than the first predetermined signal strength, facilitating, by the system, re-provisioning of the device for facilitating the first communication and a third communication in the second communication environment.

9. The method of claim 8, wherein the determining that the device is provisioned to communicate in the first environment comprises determining that the device is provisioned to communicate in a cellular wireless network.

10. The method of claim 8, wherein the determining that the device is provisioned to communicate in the second environment comprises determining that the device is provisioned to communicate in an Institute of Electrical and Electronics Engineers 802.11x based network.

11. The method of claim 8, wherein the second predetermined signal strength is less than or equal to −70 decibel-milliwatts.

12. The method of claim 8, wherein the first predetermined signal strength is greater than or equal to −50 decibel-milliwatts.

13. The method of claim 8, wherein the re-provisioning of the device comprises triggering an in-call transfer from a first wireless communication connection to a second wireless communication connection.

14. A tangible computer-readable storage medium, comprising computer executable instructions that, in response to execution, cause a computing system comprising a processor to perform operations, comprising:
determining a strength level of a signal that is transmitted by a first device and received by a second device by querying the second device to obtain a measurement of the strength level of the signal;
in response to determining that the first device is not provisioned to communicate in the first environment, determining whether the first device is provisioned to communicate in a second environment and determining whether the strength level of the signal is less than a second predetermined strength level that is lower than a first predetermined strength level, wherein the first predetermined strength level is associated with facilitating a first communication in the second environment;
in response to determining that the first device is provisioned to communicate in the second environment and that the strength level of the signal is less than the second predetermined strength level, re-provisioning the first device to facilitate establishing a second communication in the first environment; and
in response to determining that the first device is provisioned to communicate in the first environment and that the strength level of the signal is greater than the first predetermined strength level, re-provisioning the first device to facilitate establishing the first communication and a third communication in the second environment.

15. The tangible computer-readable storage medium of claim 14, wherein the re-provisioning of the first device comprises facilitating roaming of the first device between the first environment and the second environment.

16. The tangible computer-readable storage medium of claim 14, wherein the re-provisioning of the first device comprises facilitating establishing a three-party call between the first environment and the second environment.

17. The tangible computer readable storage medium of claim 14, wherein the first environment is associated with a set of cellular wireless network devices.

18. The tangible computer-readable storage medium of claim 14, wherein the second environment is associated with a plurality of Institute of Electrical and Electronics Engineers 802.11x enabled network devices.

19. The system of claim 1, wherein the operations further comprise:
facilitating roaming of the device between the first communication environment and the second communication environment.

20. The system of claim 1, wherein the operations further comprise:
facilitating establishing a three-party call between the first communication environment and the second communication environment.

* * * * *